US012189742B2

(12) United States Patent
Gookin et al.

(10) Patent No.: US 12,189,742 B2
(45) Date of Patent: Jan. 7, 2025

(54) MACHINE LEARNING FINGERPRINTING OF WIRELESS SIGNALS AND RELATED SYSTEMS, METHODS, AND COMPUTER-READABLE MEDIA

(71) Applicant: Northrop Grumman Systems Corporation, Falls Church, VA (US)

(72) Inventors: Benjamin C. Gookin, Denver, CO (US); David Domico, Aurora, CO (US); Justin Kopacz, Aurora, CO (US); Matthew D. Popovich, Denver, CO (US); Michelle Jin, Santa Monica, CA (US); Nathanael M. Harmon, Colorado Springs, CO (US)

(73) Assignee: Northrup Grumman Systems Corporation, Falls Church, VA (US)

( * ) Notice: Subject to any disclaimer, the term of this patent is extended or adjusted under 35 U.S.C. 154(b) by 94 days.

(21) Appl. No.: 17/666,353

(22) Filed: Feb. 7, 2022

(65) Prior Publication Data

US 2023/0252118 A1 Aug. 10, 2023

(51) Int. Cl.
*G06F 21/32* (2013.01)
*G06N 3/084* (2023.01)
*G06V 10/44* (2022.01)
*G06V 40/12* (2022.01)
*H04W 12/062* (2021.01)
(Continued)

(52) U.S. Cl.
CPC ............ *G06F 21/32* (2013.01); *G06N 3/084* (2013.01); *G06V 10/454* (2022.01); *G06V 40/12* (2022.01); *H04W 12/062* (2021.01); *H04W 12/10* (2013.01); *H04W 12/69* (2021.01)

(58) Field of Classification Search
CPC ...... G06F 21/32; G06F 21/44; H04W 12/062; H04W 12/10; H04W 12/69; H04W 12/12; H04W 12/07; H04W 12/79; G06V 40/12
USPC ........................................................ 713/186
See application file for complete search history.

(56) References Cited

U.S. PATENT DOCUMENTS

| 7,724,717 | B2 * | 5/2010 | Porras ................... | H04W 12/06 370/332 |
| 10,122,479 | B2 * | 11/2018 | Dzierwa ............... | H04B 17/391 |
| 10,645,601 | B2 * | 5/2020 | Kleinbeck .............. | H04B 17/20 |

(Continued)

OTHER PUBLICATIONS

Yongxin Liu, Machine Learning for the Detection and Identification of Internet of Things Devices: A Survey; IEEE 2021 (Year: 2021).*

(Continued)

*Primary Examiner* — Samson B Lemma
(74) *Attorney, Agent, or Firm* — TraskBritt

(57) ABSTRACT

The present disclosure is directed toward systems and methods for fingerprinting wireless communications using few-shot learning techniques. The systems and methods relate to storing fingerprint data indicating device fingerprint features detected for a plurality of identified transmitting devices in a database. The methods further relate to receiving, at a communication device, wireless communications from an unidentified transmitting device. Additionally, the systems and methods illustrate determining a device fingerprint responsive to a portion of each of the wireless communications using few-shot learning techniques and comparing the determined device fingerprint to the stored fingerprint data in the database.

19 Claims, 10 Drawing Sheets

(51) Int. Cl.
*H04W 12/10* (2021.01)
*H04W 12/69* (2021.01)

(56) References Cited

U.S. PATENT DOCUMENTS

| | | | | |
|---|---|---|---|---|
| 11,082,869 | B2* | 8/2021 | Carbajal | H04W 16/14 |
| 11,509,668 | B2* | 11/2022 | Akella | G06N 3/04 |
| 2006/0226951 | A1* | 10/2006 | Aull | G06Q 20/40145 340/5.61 |
| 2007/0025265 | A1* | 2/2007 | Porras | H04W 12/122 370/252 |
| 2010/0052851 | A1* | 3/2010 | Kaehler | H04L 63/0861 340/5.81 |
| 2017/0212210 | A1* | 7/2017 | Chen | G01S 5/06 |
| 2017/0290075 | A1* | 10/2017 | Carbajal | H04L 27/0006 |
| 2018/0014217 | A1* | 1/2018 | Kleinbeck | H04W 24/10 |
| 2018/0211179 | A1* | 7/2018 | Dzierwa | H04B 17/391 |
| 2019/0230540 | A1* | 7/2019 | Carbajal | H04W 76/11 |
| 2019/0253905 | A1* | 8/2019 | Kleinbeck | H04W 24/08 |
| 2020/0260306 | A1* | 8/2020 | Kleinbeck | H04B 17/27 |
| 2020/0382961 | A1* | 12/2020 | Shattil | H04W 12/122 |
| 2021/0281565 | A1* | 9/2021 | Akella | H04L 63/0876 |
| 2021/0281566 | A1* | 9/2021 | Akella | H04W 12/71 |
| 2021/0281582 | A1* | 9/2021 | Akella | H04W 12/06 |
| 2021/0360453 | A1* | 11/2021 | Kleinbeck | H04B 17/29 |
| 2023/0118723 | A1* | 4/2023 | Carbajal | H04W 76/11 455/67.11 |

OTHER PUBLICATIONS

Soorya Gopalakrishnan, Robust Wireless Fingerprinting via Complex-Valued Neural Networks, Department of Electrical and Computer Engineering University of California, Santa Barbara; Aug. 26, 2019 (Year: 2019).*

Shen, Guanxiong, Radio Frequency Fingerprint Identification for LoRa Using Spectrogram and CNN, Dec. 30, 2020 (Year: 2020).*

Shen, Guanxiong, Radio Frequency Fingerprint Identification for LoRa Using Spectrogram and CNN, Dec. 30, 2020.*

Cekic et al. "Robust Wireless Fingerprinting: Generalizing Across Space and Time" arXiv:2002.10791 [eess.SP] (Jul. 20, 2020) pp. 1-18.

Ghose et al. "Verifying ADS-B navigation information through Doppler shift measurements," 2015 IEEE/AIAA 34th Digital Avionics Systems Conference (DASC), 2015, pp. 4A2-1-4A2-11, doi: 10.1109/DASC.2015.7311412.

Restuccia et al. "DeepRadioID: Real-Time Channel-Resilient Optimization of Deep Learning-based Radio Fingerprinting Algorithms" MobiHoc'19, Jul. 2019, Catania, Italy.

Snell et al. "Prototypical Networks for Few-shot Learning" arXiv:1703.05175v2 [cs.LG] pp. 1-13, Jun. 19, 2017.

Ying et al. "Detecting ADS-B Spoofing Attacks using Deep Neural Networks" arXiv:1904.09969v1 [cs.CR] Apr. 22, 2019, 9 Pages.

Fan et al: "A Few-Shot Learning Method Using Feature Reparameterization and Dual-Distance Metric Learning for Object Re-identification" IEEE Access, XEEE, USA, vol. 9 (Sep. 2021) pp. 133650-133662.

International Search Report for International Application No. PCT/US2023/061387, mailed May 31, 2023, 5 pages.

International Written Opinion for International Application No. PCT/US2023/061387, mailed May 31, 2023, 9 pages.

Jagannath et al: "A Comprehensive Survey on Radio Frequency (RF) Fingerprinting: Traditional Approaches, Deep Learning, and Open Challenges" arxiv.org, Cornell University Library (Jan. 2022).

Robyns et al: "physical-layer fingerprinting of LoRa devices using supervised and zero-shot learning" Security and Privacy in Wireless and Mobile Networks, ACM (Jul. 2017) pp. 58-63.

Shen et al. "Radio Frequency Fingerprint Identification for LoRa Using Deep Learning" IEEE Journal on Selected Areas in Communications, IEEE Service Center, Piscataway, US, vol. 39, No. 8 (Jun. 2021) pp. 2604-2616.

Zha et al: "Real-World ADS-B signal recognition based on Radio Frequency Fingerprinting" 2020 I:EEE 28th International Conference on Network Protocols (ICNP), IEEE (Oct. 2020) pp. 1-6.

* cited by examiner

MACHINE LEARNING FINGERPRINTING OF WIRELESS SIGNALS AND RELATED SYSTEMS, METHODS, AND COMPUTER-READABLE MEDIA

TECHNICAL FIELD

This disclosure relates generally to fingerprinting wireless signals using few-shot machine learning techniques and related methods.

BACKGROUND

Automatic Dependent Surveillance-Broadcast (ADS-B) is a protocol standard developed to track and monitor aircraft. Aircraft transponders regularly transmit ADS-B messages containing position and identification information about the aircraft. ADS-B messages are not encrypted and may be easily received and demodulated by an inexpensive software defined radio (SDR). Aircraft positions and identifications may also be easily spoofed by an SDR sending fake/fraudulent ADS-B messages. Radar has been primarily used to combat this vulnerability of the ADS-B standard but is expensive and is approaching capacity limits.

BRIEF SUMMARY

In some embodiments, a device fingerprinting system includes one or more servers configured to store, in a database, fingerprint data and known identification codes associated with a plurality of identified transmitting devices, a receiver configured to receive, from an unidentified transmitting device, wireless communications, and a machine learning computing device configured to determine a device fingerprint responsive to the wireless communications using few-shot learning techniques, and compare the determined device fingerprint to the stored fingerprint data in the database.

In some embodiments, a device fingerprinting method includes storing fingerprint data indicating device fingerprint features detected for a plurality of identified transmitting devices in a database, receiving, at a communication device, wireless communications from an unidentified transmitting device, determining a device fingerprint responsive to a portion of each of the wireless communications using few-shot learning techniques; and comparing the determined device fingerprint to the stored fingerprint data in the database.

In some embodiments, a computer-readable medium has computer-readable instructions stored thereon. The computer-readable instructions are configured to instruct one or more processors to train a neural network for fingerprinting an unidentified transmitter device. The computer-readable instructions are also configured to instruct the one or more processors to capture features of signals received from the unidentified transmitter device using the trained neural network and determine a prototype for the signals by averaging the captured features of each of the signals. The computer-readable instructions are further configured to instruct the one or more processors to compare the prototype to previously stored fingerprint data contained in a database.

BRIEF DESCRIPTION OF THE SEVERAL VIEWS OF THE DRAWINGS

To easily identify the discussion of any particular element or act, the most significant digit or digits in a reference number refer to the figure number in which that element is first introduced. Various embodiments will be described and explained with additional specificity and detail through the use of the accompanying drawings in which.

DETAILED DESCRIPTION

Figure 1:
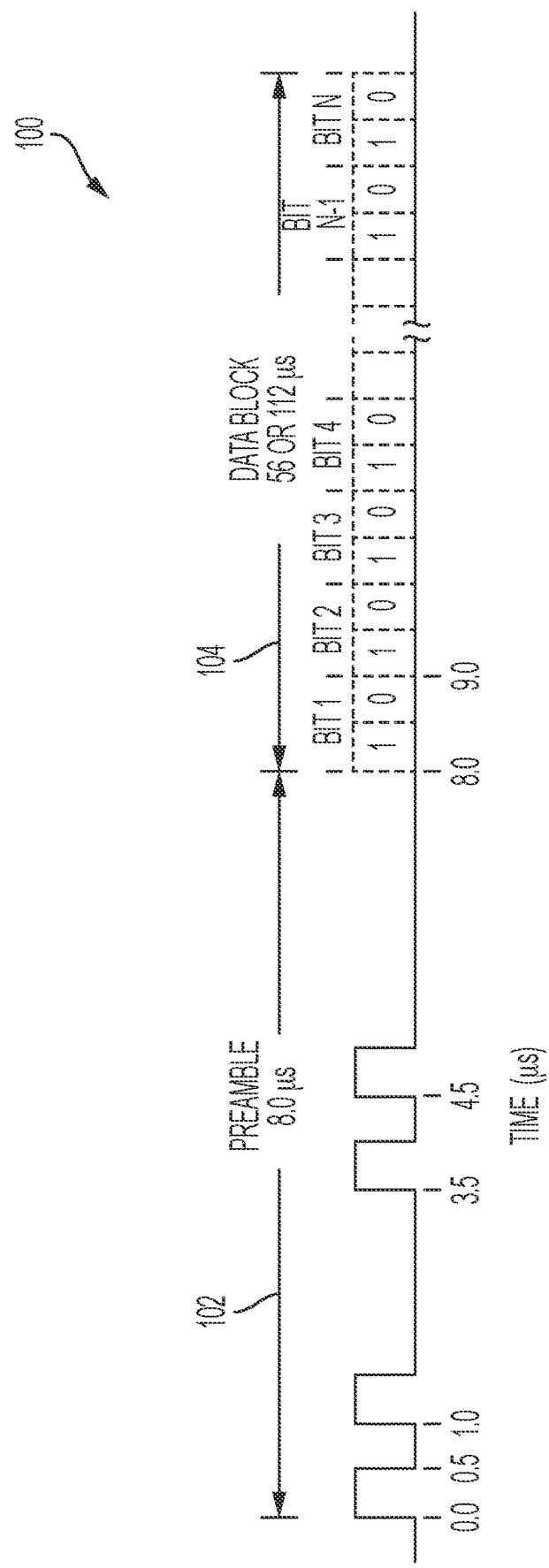
FIG. 1 is a signal timing diagram illustrating timing for an ADS-B communication waveform.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments enabled herein may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. In some instances similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts may be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Some aviation controllers have developed and implemented a standard called Automatic Dependent Surveillance-Broadcast (ADS-B) to identify and track aircraft. Under this protocol, aircraft actively broadcast their location information, along with other telemetry data, to air traffic controller ground stations, instead of only being passively observed by ground-based detectors (e.g., radar) that monitor and estimate aircraft positional information.

ADS-B messages are not encrypted or secured. With an inexpensive Software Defined Radio (SDR), hobbyists may set up an ADS-B receiver and collect unencrypted data transmitted by nearby aircraft. Furthermore, malicious agents (e.g., non-aircraft devices) may transmit their own ADS-B messages and spoof aircraft using an SDR. For example, these malicious agents may either transmit messages that incorrectly update the positions of real aircraft (e.g., a message replay attack), or create their own ghost planes by transmitting a series of messages which seem to indicate the presence of an aircraft, without an aircraft actually being present. The burden of validating ADS-B messages generally falls on primary radar systems. Various embodiments of the present disclosure relate to methods of validating the source of ADS-B messages by using a convolutional neural network (CNN)-based prototypical network for use in fingerprinting Radio Frequency (RF) emitters. Various embodiments of the present disclosure may include an end-to-end solution that takes, as an input, raw in-phase/quadrature phase (IQ) data from the ADS-B message from the aircraft and determines an RF fingerprint therefrom. An RF fingerprint may uniquely represent the ADS-B transmitter onboard an aircraft, enabling discrimination between malicious entities spoofing known aircraft and the ADS-B transmitter onboard the aircraft. One way to create a fingerprint for an emitter is to generate a collection of expertly crafted features that rely on domain expertise related to the emitter type and the protocol being used. Various embodiments disclosed herein, however, may use a feature extraction capability of CNNs as a first operation in identifying latent representations of an ADS-B message preamble to allow for building a high-dimensional decision surface on which to perform specific emitter identification (e.g., schematically illustrated in FIG. 7 and described more fully below).

The broadcast of an ADS-B message includes a 24-bit International Civil Aviation Organization (ICAO) address that is an identification code unique to each aircraft and a preamble that is identically modulated for every ADS-B system. Because aircraft are identified in every broadcast message, tasks related to aircraft identification may be performed. Additionally, since the preamble is identical across all aircraft with ADS-B systems, this portion of the message may be used for RF fingerprinting of the specific transmitting device.

The ADS-B standard enables an aircraft to periodically broadcast its position information (e.g., altitude, geolocation, GPS coordinates, heading, identification, etc.) using a mode-S (mode selective) signaling scheme at a nominal rate of 1 Hz. Mode-S is one of three primary modes for civil aircraft transponders (the others being mode-A used for communicating aircraft identification and mode-C used for communicating aircraft altitude). Mode-S allows for both interrogation of an aircraft for data (uplink) and also broadcast of data by an aircraft (downlink). Each mode-S downlink frame contains a preamble and a data block encoded via Pulse Position Modulation (PPM) on a 1.09 GHz carrier at a rate of 1 Mbps.

PPM is a form of signal modulation in which a single burst of energy is sent during a given period T The sample period T is broken into equally spaced windows in the time domain. The value transmitted is dependent on which window corresponds to the single burst of energy. The value represents Mbits and the transmission rate of the signal is M/T bits per second. According to the ADS-B protocol, one bit is transmitted in every PPM sample period which is otherwise known as Binary Pulse Position Modulation (BPPM). ADS-B also defines each sample period with a length of 1 μs which equates to a PPM modulation with T=1 μs and M=1 giving a bitrate of 1 Mbps.

FIG. 1 is a signal timing diagram illustrating timing for an ADS-B communication waveform 100, according to some embodiments. FIG. 1 shows that a mode-S preamble 102 lasts for 8 μs followed by a data block 104 of either 56 μs (short squitter) or 112 μs (extended squitter) modulated with PPM. The preamble 102 typically contains four 0.5 μs pulses: one at 0 μs from a beginning of the ADS-B communication waveform 100 followed by additional pulses at 1 μs, 3.5 μs, and 4.5 μs. The preamble 102 enables synchronization of the receiver's clock to the transmitter's clock for decoding of the subsequent data block 104. The data block 104 contains information about the aircraft's current state and generally changes between messages while the preamble 102 encodes identical information in every message. By way of example, the transmit center frequency may by 1.09 GHz.

The downlink message data block 104 may contain various pieces of information about the aircraft. The first part of the data block 104 is the downlink format, which informs of the size and content of the incoming data block 104 (e.g., short or extended squitter). If the data format is of the extended squitter type (e.g., a value of $10001_2=17_{10}$), the rest of the message includes capability, ICAO aircraft address, ADS-B data, and parity bits as further illustrated in Table I. "Capability" may refer to a number of sub-types of the ADS-B message. The ICAO address is a 24-bit field representing an identification code unique to every aircraft. ADS-B data may include aircraft type, airborne position, encoded latitudes, encoded longitudes, airborne velocity, surface position, altitude, and aircraft identification (e.g., aircraft callsign, where aircraft callsign may be different from ICAO).

TABLE I

| | Field | | | | |
|---|---|---|---|---|---|
| | Downlink Format | Capability | ICAO Aircraft Address | ADS-B Data (Optional) | Parity/ Interrogator ID |
| Size | 5 bits | 3 bits | 24 bits | 56 bits | 24 bits |
| Index | 0 | 5 | 8 | 32 | 88 |

The reported position may be ambiguous and may be given as a local position based on one of four possible positions in the world. The correct basis location may be inferred by using the position closest to the receiver. To calculate the global position of an aircraft, two frames may be received: one odd position frame and one even position frame. The geolocation indicating the current location of the aircraft may be determined responsive to the reported position including the received position frames. The parity bits allow for error detection of the received data block 104.

Some ways that emitters' electrical characteristics including center frequency, bandwidth, and modulation scheme may be estimated include hand-engineered or expert approaches. Modulation recognition defines a process where a digitally sampled waveform, or IQ data, is processed to estimate the analog or digital modulation. Some approaches to solve this classification problem may include using human-engineered features such as cumulants, which are reasoned over using decision-theoretics, pattern recognition, or Support Vector Machines (SVMs).

In decision-theoretic approaches, a decision tree is used to reason over the statistically derived signal features to narrow down the classification space through multiple binary decisions. The decision tree determines if the waveform is digital or analog modulated. If analog, the decision tree then decides if the waveform is modulated using Vestigial Sideband Modulation (VSB) or amplitude modulation (AM)/ multiple amplitude shift keying (MASK). The process follows until the modulation is selected. Some SVM and neural network-based techniques use the same statistically derived features and learn the decision boundaries to classify the waveform.

Since the feature extraction process has already been performed by a human, these models generally converge much faster than deep learning-based approaches; but are inherently limited by the quality of the extracted features. Further, these hand-crafted features may not be robust enough to capture subtle details that separate new waveforms and access strategies.

Rather than depending on human-engineered or statistically defined features, deep learning may be used to learn representative features useful for modulation recognition. CNNs may be especially effective at capturing patterns that manifest over varied length inputs, including on simulated signals with Additive White Gaussian Noise (AWGN) to identify modulation. CNNs encode the signal into a latent representation, and they are analogous to a learned hierarchical bank of nonlinear matched filters, which are robust to channel impairments.

CNN-based approaches may be advantageous as compared to approaches using higher order cumulants when trained on only the raw IQ data (e.g., no expert features extracted), especially for signals with a low Signal-to-Noise Ratio (SNR). Transfer learning with CNNs for training on synthetic signals and testing on signals transmitted over-the-air indicates that CNNs are able to extract representative features that account for noise introduced by transmitting/receiving systems and over-the-air effects including fading, Doppler shift, and multipath in addition to AWGN.

By altering a loss function and labels when training deep neural networks, neural networks may be trained to perform different tasks. Under a specific training paradigm, a neural network may learn to recognize a specific emitter based on a unique RF fingerprint naturally imparted by subtle hardware imperfections within that transmitter. This recognition of a specific emitter may involve learning discriminating features that represent these imperfections rather than characteristics of the emitter's spectrum access strategy (e.g., modulation, bandwidth, center frequency) or data payload.

Without careful consideration, it is possible that an RF fingerprinting process will learn an easier task of demodulating a waveform and exploit information inside of the transmitted message. By way of example, in the domain of fingerprinting handheld radios, a model may learn to recognize a voice of a speaker rather than the characteristics of the specific radio. The operator of the radio then becomes a non-stationary feature that has been incorrectly assigned to the device as a fingerprint. Similarly, an RF fingerprinting process may utilize information from an ADS-B communication waveform, such as the ICAO identification code itself, which uniquely identifies the aircraft, rather than actually detecting an RF fingerprint.

Understanding what information a neural network is exploiting is a challenge in the field of machine learning. To minimize the likelihood of identifying a fingerprint based on easily identifiable information, instead of determining a fingerprint using the payload of the ADS-B message, which may be subject to exploiting information in the message, the present disclosure uses the IQ data of the ADS-B preamble, which does not contain any identifiable modulated data.

Even with valid data considerations, an RF fingerprint may be distorted across days and locations due to clock drift or variations in the wireless channel (e.g., weather). These effects are more descriptive than subtle nonlinear characteristics caused by transmission hardware that are the basis for stable signatures; therefore, it may be difficult for the trained neural network to generalize well across space and time. Addressing these challenges following standard deep learning paradigms may involve using numerous examples per aircraft (e.g., more than 10,000).

The unencrypted nature of ADS-B transmissions grants attackers the ability to freely receive, parse, and transmit messages. Securing the ADS-B protocol with various encryption or message signing techniques would require additional transmitted data in each ADS-B message, and the approach to globally distribute and manage certificates and/or keys to a growing population of aircraft poses additional challenges.

Other passive solutions that may validate ADS-B messages include using easily observable characteristics of the waveform such as Doppler shift or time delays. By comparing the observed waveform with a synthetic message augmented by the estimated Doppler shift calculated by using the reported velocity and position of the aircraft, the physical origin of a packet may be determined and verified. While this approach may defeat some ground-based attacks (e.g., creating a ghost aircraft), attackers may circumvent this protection by imitating the same Doppler shift with an artificial frequency shift.

Some solutions may apply deep neural networks to ADS-B spoof detection by feeding an entire transmitted message (preamble and payload) as IQ data into a binary classification neural network. While results may be effective, data is likely leaked through the payload that the model is exploiting. In other words, the deep neural network may be using the identification information communicated in the ADS-B communication. Further, such a proposed system may work only for aircraft seen during training, and the neural network is retrained for each new aircraft that the model will interrogate.

Deep learning architectures may generally use a significant volume of data to learn features associated with a particular class. One challenge for fingerprinting ADS-B preambles is the limited number (e.g., 100 or less) of observations of a specific aircraft as it flies by, compared to an ideal 10,000+ observations for standard deep learning tasks. Additional challenges exist with an increasing number of global aircraft, prompting a need for online learning as new aircraft (e.g., unseen during training) will be frequently encountered.

As used herein, the phrase "few-shot learning" refers to making classifications or regressions based on a very small number of samples (e.g., less than 100 samples such as less than 100 ADS-B preambles), especially when compared to standard machine learning techniques, which generally require more than 10,000 samples. Prototypical networks address the problem of few-shot learning, where data per class is limited, by training a neural network to learn a prototype latent representation for each class. The neural network is then a non-linear mapping of inputs to an embedding where the class's prototype is the mean of its support in this space. This may result in a network architecture without a fixed set of classes that may use few or many observations of each aircraft.

Once the network is trained, the network may take as inputs observations of novel aircraft, build a set of supports in the embedded space, and derive a prototype for the new aircraft. This may be analogous to a K Nearest Neighbor classifier with a learned feature space. Numerous unique aircraft observed through ADS-B messages may be used to build up supports for the aircraft in the embedded space. Since new unknown (e.g., previously unidentified) aircraft may enter the airspace at any time, prototypical networks allow for the new fingerprints to be added with no additional training.

A fingerprint for a single aircraft may not be dynamic, but the observation of the aircraft may have other dynamic influences due to environmental factors including temperature, Doppler shift, or distance from the receiver. Distributed observation over multiple days to form a dataset may account for these variations.

To reduce (e.g., minimize) the likelihood of exploiting easily identifiable information contained in ADS-B messages, the various embodiments disclosed herein may improve on other ADS-B discrimination techniques by processing only the preamble. As neural networks easily learn to demodulate IQ data, processing only the preamble removes the model's ability to extract and exploit the aircraft's unique identifier, or ICAO identification code, embedded in each ADS-B message.

Prototypical neural networks are an approach for few-shot classification in which a classifier learns to discriminate classes with a small number of samples per class (few-shot learning). Prototypical networks learn a mapping into a latent space with a learned projection function $f_\theta$, and the classification task is performed by computing distances to prototype representations of each class in this space, computed by averaging the provided samples for each class. The quality of the class prototype is defined by the number of samples used to create the prototype, known as the support set, and the quality of the learned feature space.

The framing of the prototypical networks problem is modified for RF fingerprinting in the present disclosure. In this case, support sets of IQ preambles are formed for known aircraft to create the fingerprints. A query set is then used to verify the identity of an aircraft and to compute loss during training. These two sets are defined as Support S: The set of ADS-B samples x that are used to create a fingerprint with associated ICAO label y.
Query Q: A set of ADS-B samples to verify against known fingerprints with no label.

To learn the embedding function, the support set for all known aircraft is passed through the embedding function and class prototypes are formed with $$p_k = \frac{1}{S_k} \sum_{(x_i, y_i) \in S_k} f_\theta(x_i)$$

where $p_k$ is the prototype for aircraft k, $S_k$ is the set of all examples associated with aircraft k, and $\theta$ represents the weights of the embedding function. The embedding function may be a convolutional neural network as illustratively defined in Table II. As a non-limiting example, for 60 unique aircraft with 40 IQ observations of each aircraft's preambles, this process yields 60 fingerprints (one for each aircraft).

TABLE II

| Type | Filters | Size/Stride | Input | Output |
| --- | --- | --- | --- | --- |
| Conv | 128 | 1 × 50/1 | 2 × 1 × 800 | 128 × 1 × 751 |
| Conv | 128 | 1 × 6/2 | 128 × 1 × 751 | 128 × 1 × 373 |
| Conv | 32 | 1 × 6/2 | 128 × 1 × 373 | 32 × 1 × 184 |
| Conv | 32 | 1 × 6/2 | 32 × 1 × 184 | 32 × 1 × 90 |
| Conv | 32 | 1 × 6/2 | 32 × 1 × 90 | 32 × 1 × 43 |
| Conv | 32 | 1 × 6/2 | 32 × 1 × 43 | 32 × 1 × 19 |
| Dense | | | 608 | 128 |

The effectiveness of the embedding function $f_\theta$ is for discriminating aircraft may be determined by following a similar process as that described above to project a query set of the same aircraft into the embedding space. During training, the query set may have fewer examples per class (e.g., 20) to match the operational context. The embedded samples are averaged together to create a single query as $$q_k = \frac{1}{Q_k} \sum_{(x_i, y_i) \in Q_k} f_\theta(x_i)$$

where $q_k$ is an estimated fingerprint for aircraft k. The Euclidean distance from each of the queries $q_k$ to all of the previously computed class prototypes $p_k$ is then computed. During training, this is structured similarly to a one-hot encoded vector to support computing a loss function for back propagation and optimizing $f_\theta$. During online operation, the query $q_k$ is given the label of whichever class prototype it is closest to, and the number of known classes may expand as new aircraft are encountered.

FIGS. 2-5 demonstrate an example of how data may be collected.

Figure 2:
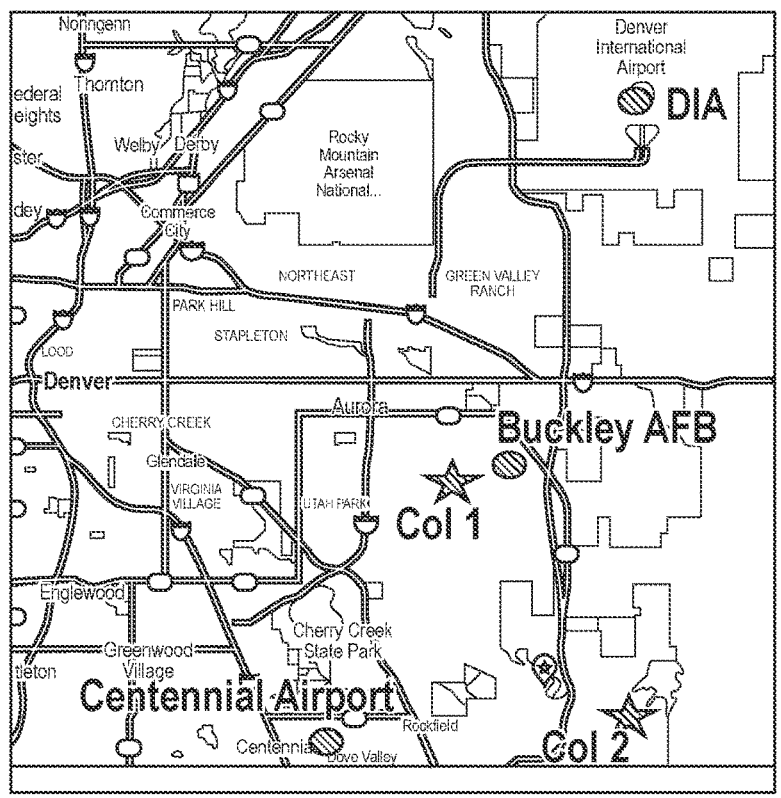
FIG. 2 is a map illustrating locations of two exemplary collection sites Col 1, Col 2 and nearby airports (Denver International Airport (DIA), Centennial Airport, and Buckley Airforce Base (AFB)).

FIG. 2 is a map 200 illustrating locations of two exemplary collection sites Col 1, Col 2 and nearby airports (Denver International Airport (DIA), Centennial Airport, and Buckley Airforce Base (AFB)). The two collection sites Col 1, Col 2 gather over-the-air ADS-B messages and associated preambles to form a dataset including different look angles, as shown in FIG. 2. This distributed collection provides multiple observations of the same aircraft with varied Doppler shifts, Received Signal Strength Indicator (RSSI), and receiver hardware effects, thus mitigating any substantive effect from these phenomena.

By collecting ADS-B messages over the course of multiple days, it may be common to have aircraft visit multiple times in the dataset.

Figure 3:
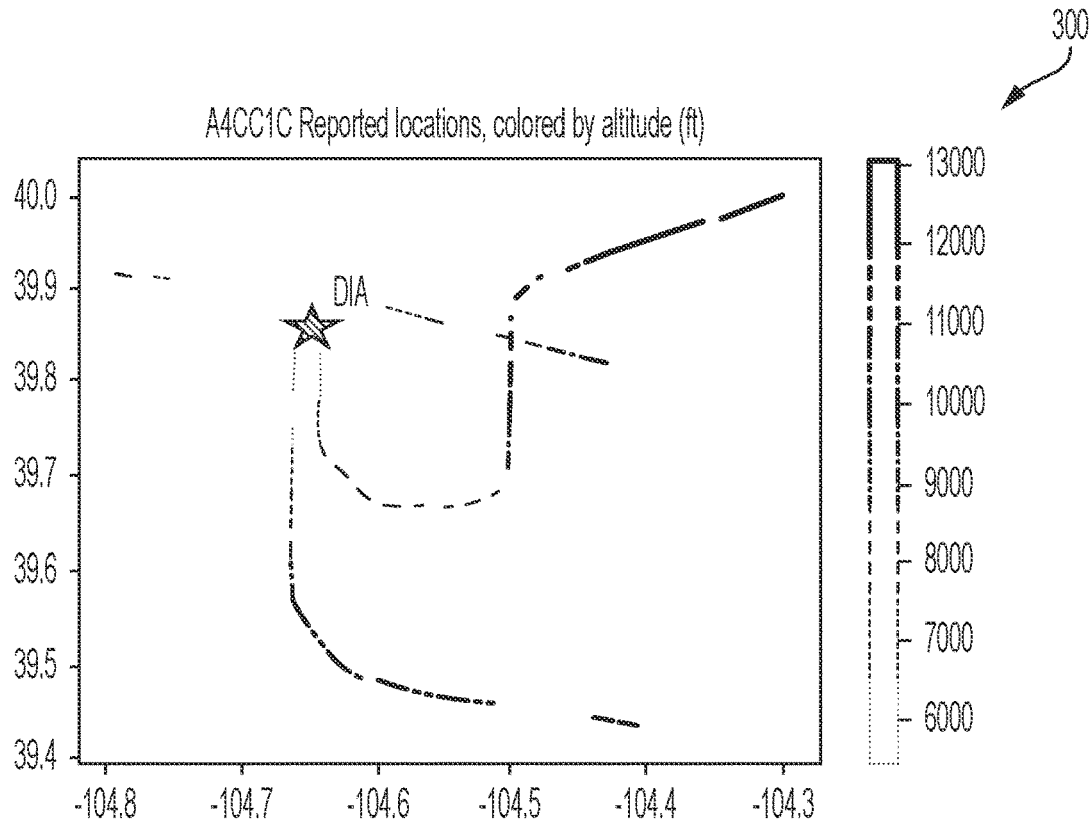
FIG. 3 shows an altitude plot for an aircraft A4CC1C, an Airbus A320-300 operated by United Airlines.

FIG. 3 shows an altitude plot 300 for an aircraft A4CC1C, an Airbus A320-300 operated by United Airlines. Altitude plot 300 indicates that the aircraft A4CC1C visited the Denver International Airport DIA three times. By observing aircraft over multiple days, the impacts of environmental factors may be reduced when learning fingerprints.

After collection, observations of the aircraft may look nearly identical, especially to a human observer, and variations between different aircraft are difficult to distinguish.

Figure 4:
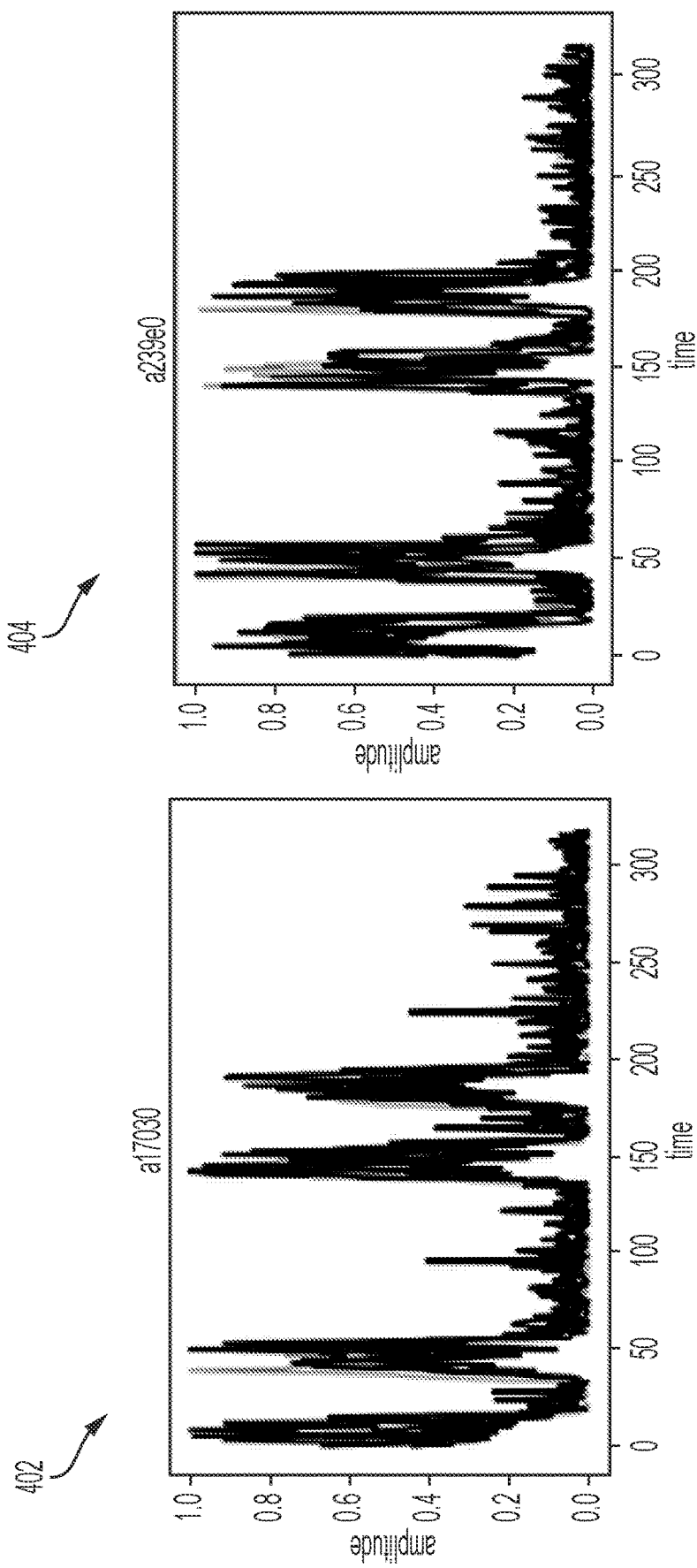
FIG. 4 illustrates example plots illustrating preambles for distinct aircraft.

FIG. 4 illustrates example plots 402, 404 illustrating preambles for distinct aircraft. Each of the plots 402, 404 shows four collections of preambles for the two distinct aircraft. On the left, plot 402 shows four collections of preambles for a Beech 1900 aircraft owned by Alpine Aviation, Inc., Mode-S code A17030, and on the right, plot 404 shows four collections of preambles for a Boeing 737 owned by United Airlines, Mode-S code A239E0. The preamble is clear enough for both aircraft and would successfully synchronize frames to enable demodulation; however, it is clear that the differences are small and subtle, showing the subtly of the features that are sought to exploit for RF fingerprinting.

The full exemplary dataset is 28 gigabytes and includes 1.7 million parsed ADS-B messages with associated IQ preambles. The dataset includes preambles for 2164 unique aircraft. The dataset is partitioned into a 90/10 train/test split such that 1924 aircraft are used for training, and the remaining 240 aircraft are for testing.

For proper training and evaluation of prototypical networks on ADS-B messages, data is sampled with respect to collection time. Support samples (e.g., the set of samples that represent the fingerprint of the aircraft's ADS-B transmitter) may occur chronologically before the query samples (e.g., the set of samples classified with respect to all support samples). If this chronology is not implemented during training and testing, information may be leaked and future information may contribute to the definition of a fingerprint. In practice, it may not be practical to perform a live demonstration without honoring the chronological constraint.

One consideration of data sampling is ensuring that the set of aircraft in the test set is disjoint from the aircraft in the training set. During real-time operations the network operates on never-before-seen aircraft, therefore testing is also performed on never-before-seen aircraft.

As a non-limiting example, training and testing may be conducted on NVIDIA Tesla V100 GPUs. Prototypical networks may require significant amounts of memory during training to simultaneously perform inference on a large number of samples (support+query)*way and measure distances. The exemplary NVIDIA V100 GPU includes 32 GB of VRAM, which is sufficient to support training. During testing, the samples may be run in batches, relaxing the memory requirement. Depending on the configuration of the support, query, and way sizes, training may take several hours.

Characteristics to consider when evaluating the discriminating performance of an RF fingerprinting process may include an amount of oversampling necessary to capture the transmission hardware effects, a signal strength of a received transmission, a number of aircraft between which the system is discriminating, etc.

Figure 5:
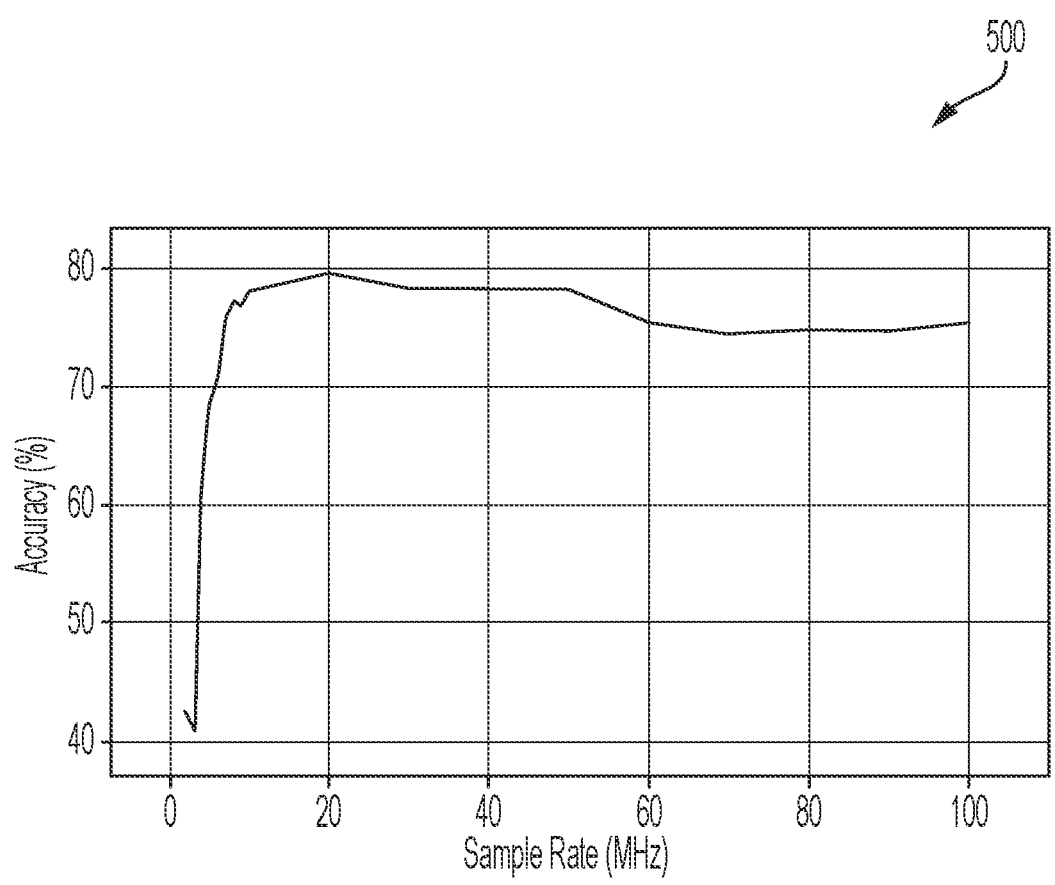
FIG. 5 is a plot that illustrates a sample rate performance curve from 1 MHz to 100 MHz when holding the CNN structure constant.

FIG. 5 is a plot that illustrates a sample rate performance curve 500 from 1 MHz (i.e., the bandwidth of the signal) to 100 MHz (i.e., 100× oversampling) when holding the CNN structure constant. The accuracy of the process when sample rates approach the bandwidth of the signal at 1 MHz is lower than the accuracy of the process at higher sample rates. The kernel shape is well suited for sample rates between 10 MHz and 30 MHz. As the sample rate is increased beyond 50 MHz, however, the fingerprinting accuracy decreases slightly. This relationship may indicate that the patterns useful for fingerprinting manifest over shorter time intervals such that the 9×2 shaped kernel may capture them. The duration of a preamble is 80 μs, so the first layer 9×2 kernel may see 8 μs simultaneously for a 10 MHz sample rate (11% of the preamble), compared to 0.9 μs when sampled at 100 MHz (1.1% of the preamble).

Other possible causes exist for the decreased performances at 100× over sampling. For example, the neural network may be overfitting to background clutter in the environment. Given the wide bandwidth nature of the 100 MHz collect, there may also be many other background signals captured in addition to the ADS-B message.

It should be noted that ADS-B communication is featured only as an example in the present disclosure. The disclosure, however, is not limited to ADS-B. The few-shot learning-based RF fingerprinting process has applications beyond ADS-B, such as, for example, Automatic Identification System (AIS). AIS is similar to ADS-B as it provides a similar basic functionality for automated ship tracking and enables vessel traffic services. With proper consideration for the data presented to the model, the process disclosed herein for learning fingerprinting may be directly applied to AIS and a wide variety of other RF emitters in radar and communications systems including Wi-Fi, Bluetooth, Zigbee, GPS, etc. The fingerprinting disclosed herein may also be applied to any wireless communications, especially where at least a segment of the communications is known (e.g., such as the preamble in ADS-B communication).

Few-shot learning techniques may be applied to learn RF fingerprints that capture subtle features caused by naturally imparted hardware imperfections in ADS-B transmitters onboard aircraft. An advantage of this technique is that it requires fewer observations of each individual aircraft (e.g., 50 observations) compared to the large data demands of some deep learning approaches (e.g., 10,000+ observations per class).

Prototypical neural networks learn a CNN-based projection of nearly identical ADS-B preambles, which contain no modulated information, as IQ data into a high-dimensional feature space. This process may be applied to measure fingerprints online as new aircraft fly near the software defined ADS-B receivers for the purpose of identifying transmitters attempting to maliciously spoofing other aircraft.

Figure 6:
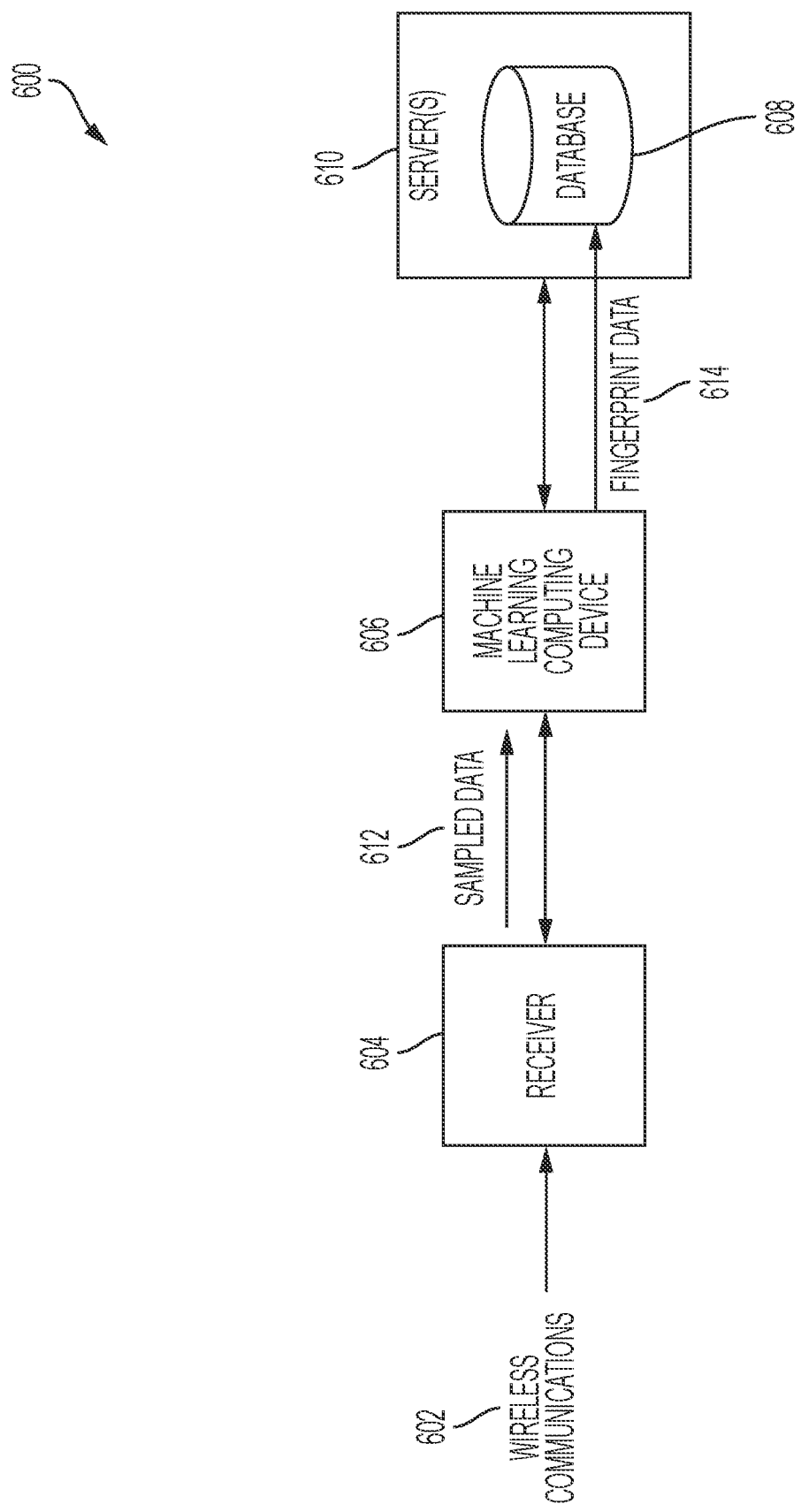
FIG. 6 is a block diagram of a fingerprinting system, according to one or more embodiments.

FIG. 6 is a block diagram of a fingerprinting system 600 according to one or more embodiments. Fingerprinting system 600 may include a receiver 604, a machine learning computing device 606, and one or more server(s) 610. Receiver 604 may, without limitation, be an SDR and may be tuned to a particular frequency (e.g., 1.09 GHz, without limitation) used to receive wireless communications 602 (e.g., ADS-B messages). The wireless communications 602 may be over-the-air messages transmitted by aircraft as they fly near the receiver 604. The receiver 604 may be configured to sample the wireless communications 602 at a frequency that is higher than the bandwidth of the original transmitted signal. By way of example, the bandwidth of the received wireless communications 602 including the ADS-B message may be 1 MHz and the receiver 604 may sample the wireless communications 602 at 20×, 40×, or 100× of the original transmitted signal bandwidth (e.g., 20 MHz, 40 MHz, or 100 MHz, respectively). The process of fingerprinting may be improved by oversampling because it may enable a higher resolution observation of the subtle differences that enable determining a device fingerprint. The data sampled by the receiver 604 (e.g., sampled data 612) may be provided to a machine learning computing device 606.

Machine learning computing device 606 may be, without limitation, a machine learning workstation. Machine learning computing device 606 may be configured to communicate with and receive sampled data 612 from the receiver 604 for demodulation and fingerprinting. Machine learning computing device 606 may perform acts including framing, demodulating, and decoding the sampled data 612. The machine learning computing device 606 may be configured to extract a unique identifier (e.g., ICAO aircraft address identification code) and positional information from the wireless communications 602. The machine learning computing device 606 may also be configured to extract a preamble from each of the wireless communications 602. The preamble may include in-phase and quadrature-phase (IQ) data. The machine learning computing device 606 may use the IQ data to compute and/or determine a fingerprint for the transmitting device that sent the received wireless communications 602, in accordance with various embodiments of the present disclosure.

Server(s) 610 may be configured to store data, including fingerprint data 614, in one or more databases 608 of the server(s) 610. Machine learning computing device 606 may be configured to communicate with server(s) 610 to identify and compare the determined fingerprint with the fingerprint data 614 that is stored in the server(s) 610. Server(s) 610 may be co-located to the machine learning computing device 606 or server(s) 610 may be remote to (e.g., in a different location) the machine learning computing device 606 and/or the receiver 604.

Figure 7:
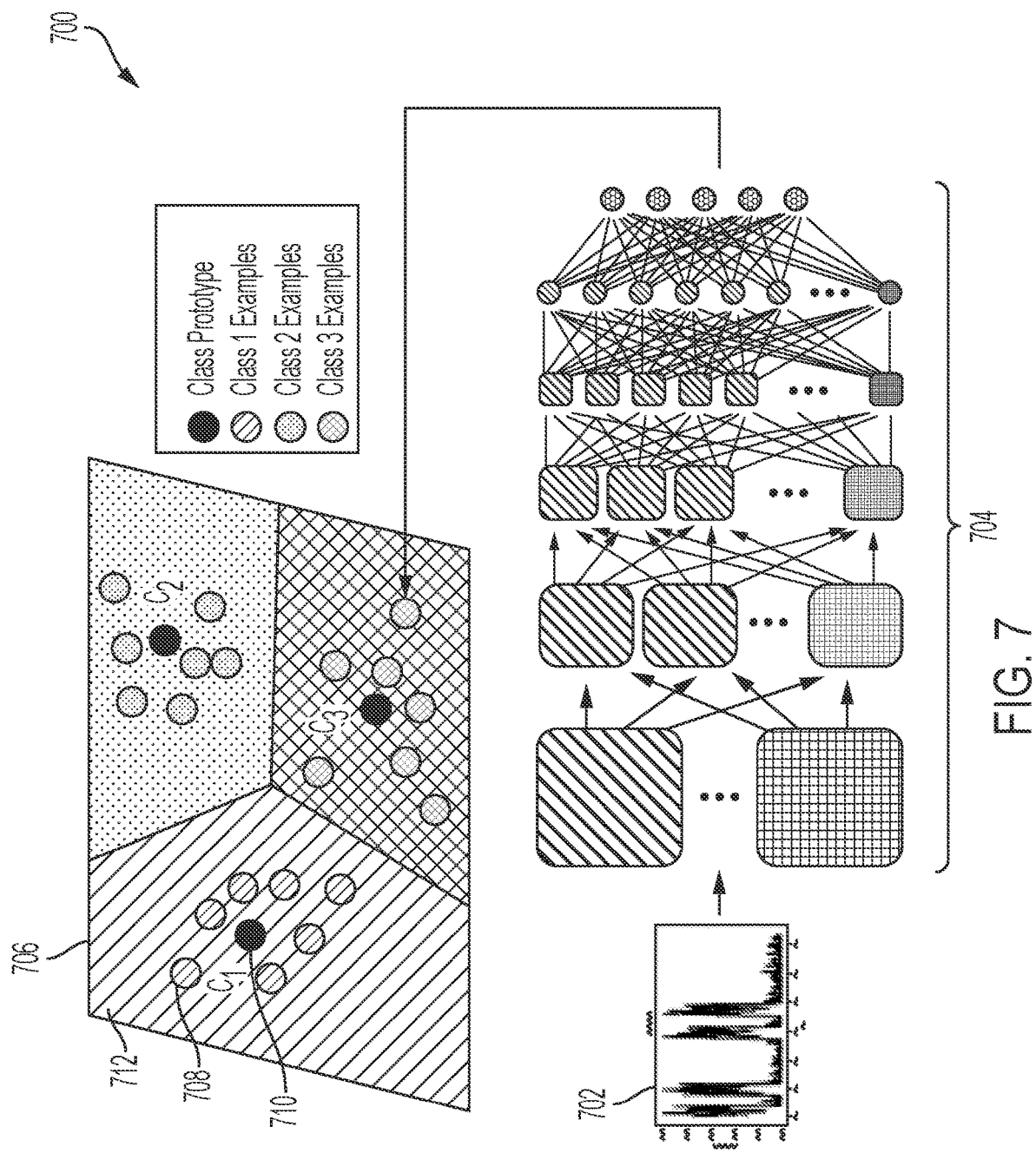
FIG. 7 is a functional flow diagram illustrating a process for classifying a fingerprint of a radio frequency (RF) emitter, in accordance with one or more embodiments of the present disclosure.

FIG. 7 is a functional flow diagram 700 illustrating a process for classifying a fingerprint of an RF emitter, in accordance with one or more embodiments of the present disclosure. An ADS-B message preamble 702 is fed into pre-trained fingerprinting CNN 704. CNN 704 may be a prototypical neural network that performs few-shot learning. CNN 704 maps the preamble 702 to a high-dimension decision surface (e.g., feature space 706, which may be an example of a latent space as disclosed in Snell et al, in "Prototypical Networks for Few-shot Learning" arXiv preprint arXiv:1703.05175 (2017)). The output of the CNN 704 may include latent representations (e.g., feature example 708) of the preamble 702 that will be placed in the feature space 706 for transmitter identification. Each of the class examples, such as example 708, included in the space for a class, such as class 712 (corresponding to a first class $c_1$), are averaged together to form a prototype (e.g., prototype 710) for the class. The same may be performed for a second class $c_2$ and a third class $c_3$, without limitation. The prototype 710 may be a representation of a "fingerprint" for the aircraft ADS-B transmitter. The prototype 710 may be stored in a database on a server (e.g., database 608 of FIG. 6). In some embodiments, all the feature examples such as example 708 may be stored in the database in addition to the prototype 710.

A particular ADS-B message may be verified by calculating the distances between a feature example resulting from an input preamble and the prototypes for each the classes $c_1$, $c_2$, and $c_3$ in the feature space 706. If the class that includes the prototype that is closest in the feature space 706 to the feature example corresponds to an aircraft that matches the aircraft identified by the ADS-B message, the ADS-B message may be verified.

Figure 8:
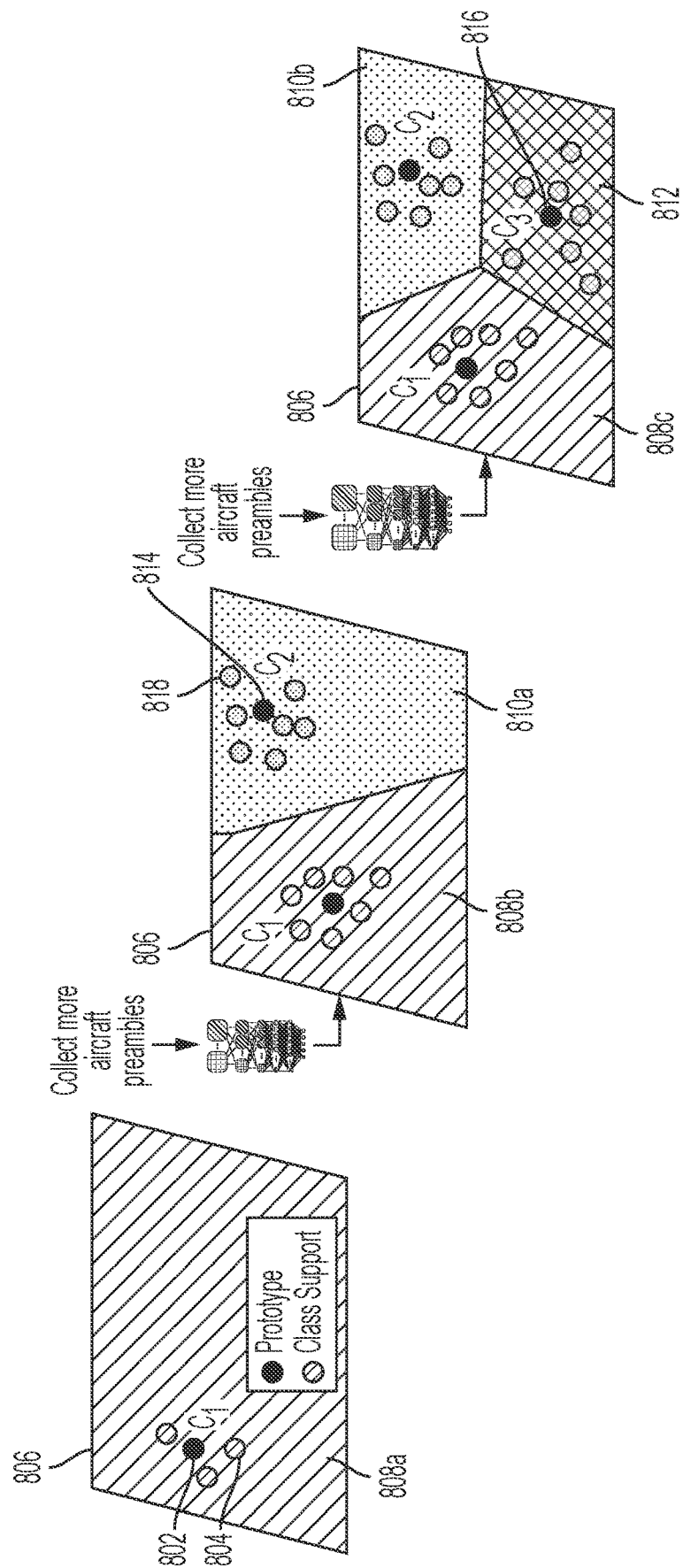
FIG. 8 is an illustration of a process of adding new fingerprints to a feature space.

FIG. 8 is an illustration of a process of adding new fingerprints to a feature space 806. The processes illustrated in FIG. 8 may be performed, without limitation, by machine learning computing device 606 of FIG. 6. The initial decision surface for feature space 806 includes a single class space 808a. The class space 808a includes class support including examples 804 and a prototype 802. The prototype 802 may, without limitation, represent an average of the class examples 804. As more aircraft ADS-B preambles are collected, feature space 806 is adjusted as support is increased for the first class space 808b and a new class space 810a is created within the feature space 806. As new support and examples are added to the feature space 806, the examples are averaged together and the system may determine that the new features, including example 818, do not correspond to the previously stored prototype 802, and a new class prototype 814 is computed and added to the feature space 806. The new class prototype 814 represents a fingerprint for a new, unique aircraft ADS-B transmitter. Furthermore, as even more new and unique aircraft ADS-B preambles are collected, new class spaces, such as class space 812 are added to the feature space 806. Additionally, class space 808c and class space 810b are adjusted accordingly to allow for the existence of the class space 812. A new class prototype 816 is also calculated and added to the feature space 806.

Figure 9:
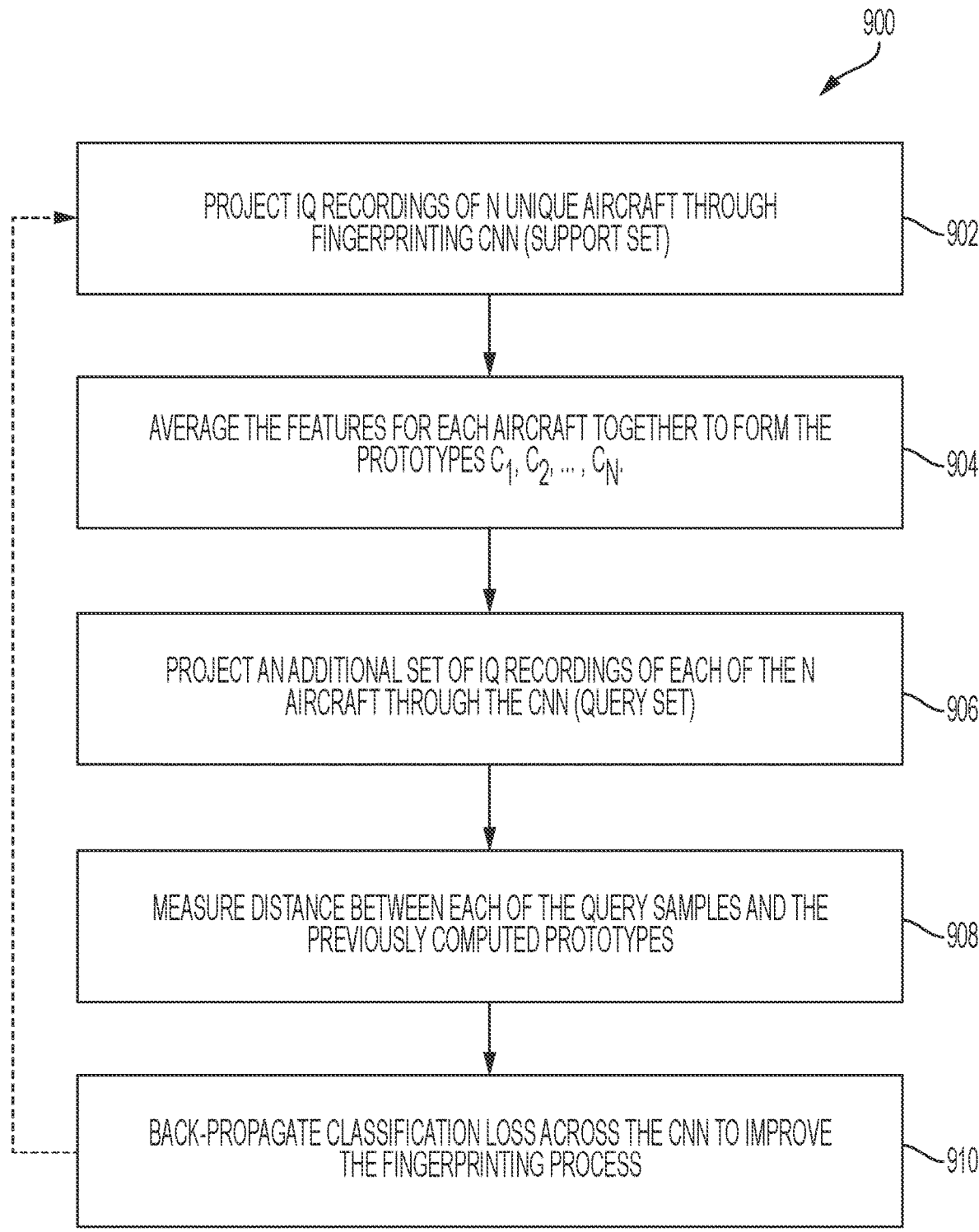
FIG. 9 is a flowchart illustrating a method of training a convolutional neural network (CNN) for use as a fingerprinting CNN.

FIG. 9 is a flowchart illustrating a method 900 of training a convolutional neural network (CNN) for use as a fingerprinting CNN (e.g., CNN 704 of FIG. 7). Method 900 may include projecting IQ recordings of a number N (e.g., N=60, without limitation) unique aircraft through a fingerprinting CNN, as shown in operation 902 of FIG. 9. The IQ recordings projected in operation 902 may comprise a support set. By way of non-limiting example, the support set may include 200 IQ recordings of each of the N unique aircraft that are passed through the fingerprinting CNN. Operation 902 may provide for an initial space of N unique aircraft, each having 200 individual features contributing to the feature space.

Method 900 may further include forming prototypes by averaging the features for each aircraft together to form the prototypes $c_1, c_2, \ldots, c_n$, as shown in operation 904. This operation 904 of averaging may be analogous to the averaging of features as discussed with respect to FIG. 7. By way of non-limiting example, prototypes $c_1, c_2, \ldots, c_{60}$, corresponding to each of the 60 unique aircraft, are formed and stored in the feature space. Method 900 may also include projecting an additional set of IQ recordings of each of the N aircraft through the CNN, as shown in operation 906 of FIG. 9. This additional set projected through the CNN may comprise a query set. Furthermore, method 900 may include measuring a distance between each of the query samples and the previously computed prototypes (e.g., the prototypes computed in operation 904), as shown in operation 908. Method 900 may further include back-propagating classification loss across the CNN to improve the fingerprinting process, as shown in operation 910. Finally, the process may return to operation 902 and method 900 may repeat until the classification loss converges and is at an acceptable level. Once the training phase illustrated in FIG. 9 is complete, the parameters, weights, and balances of the CNN are frozen and may not be changed in subsequent use of the fingerprinting CNN (e.g., use of fingerprinting CNN 704 of FIG. 7).

Figure 10:
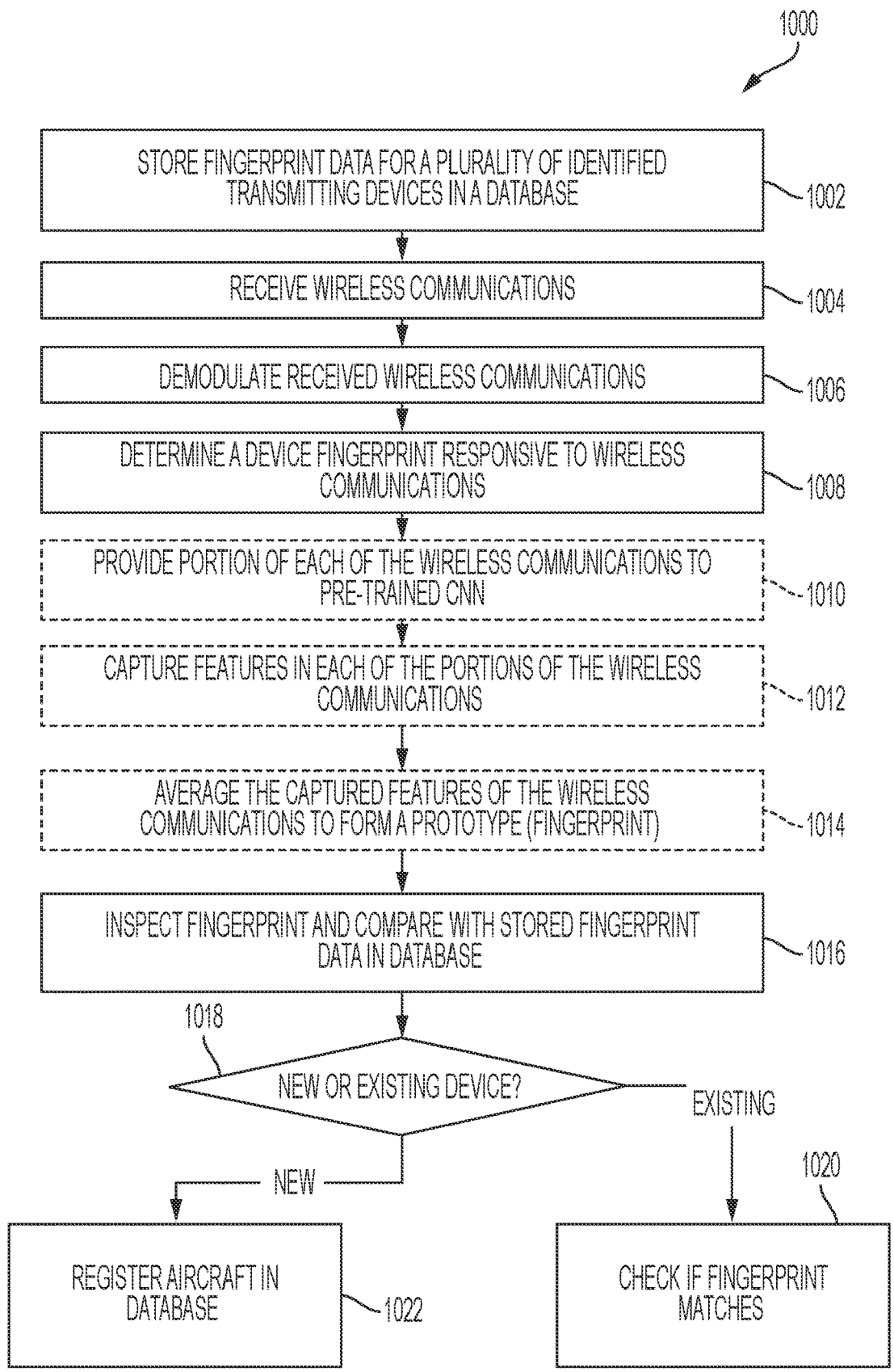
FIG. 10 is a flowchart illustrating a method of determining and registering device fingerprints in a database.

FIG. 10 is a flowchart illustrating a method 1000 of determining and registering device fingerprints in a database (e.g., database 608). The method 1000 may include storing fingerprint data for a plurality of identified transmitting devices in a database, as shown in operation 1002. The stored fingerprint data may include device fingerprint features detected for the plurality of identified transmitting devices. Prototypes (e.g., averages of features extracted from a CNN) may be stored along with and connected to unique identification codes (e.g., ICAO addresses) so that they may be easily indexed and retrievable. The stored fingerprint data may include outputs of a CNN as high-dimension feature vectors. The stored fingerprint data may include fingerprints stored during training or after training of the CNN. The stored fingerprint data may also include fingerprints of aircraft that have transmitted ADS-B messages received by a receiver (e.g., receiver 604) and demodulated by a machine learning computing device (e.g., machine learning computing device 606).

The method 1000 may also include receiving wireless communications, as shown in operation 1004 of FIG. 10. The wireless communications may be received from an unidentified transmitting device. All or parts of operation 1004 may be performed substantially by a receiver such as receiver 604 of FIG. 6. By way of non-limiting example, the unidentified transmitting device may include a transponder onboard an airplane that has not yet been identified. Furthermore, the received wireless communications may include individual ADS-B messages sent by the unidentified airplane, each message containing a preamble and modulated information including ICAO aircraft address and other position/identification data.

The method 1000 may further include demodulating the received wireless communications, as shown in operation 1006. All or part of operations 1006 through 1022 may by substantially performed by a machine learning computing device such as machine learning computing device 606 of FIG. 6. Operation 1006 of method 1000 may include several sub-operations that are not shown in FIG. 10, including framing, demodulating, and decoding the wireless communications received in operation 1004. At operation 1006, the machine learning computing device demodulates primarily the data contained in the data block (e.g., data block 104 of FIG. 1) and not the preamble (e.g., preamble 102 of FIG. 1). As such, the ICAO address and other position information may be extracted from the data block.

The method 1000 further includes determining a device fingerprint responsive to the wireless communications received at operation 1004, in accordance with various disclosed embodiments and as shown in operation 1008. Operations 1010, 1012, and 1014 may be seen as individual operations of method 1000 or they may be seen as sub-operations that are included as subroutines of operation 1008. At operation 1010 of method 1000, the machine learning computing device may provide a portion of each of the wireless communications as an input to a pre-trained CNN. The portion provided may include a preamble, and in some embodiments, only the preamble IQ data of the wireless communications is provided to the CNN. The CNN may capture features in each of the portions of the wireless communications, as shown in operation 1012 of method 1000. The features captured may include subtle differences imparted by hardware imperfections in the transmitter of the airplane. The features may be averaged to form a prototype (e.g., fingerprint), as shown in operation 1014 of method 1000.

The method 1000 further includes inspecting the fingerprint and comparing with stored fingerprint data in a database, as illustrated in operation 1016. The result of the inspection and comparison performed at operation 1016 may be to determine whether the fingerprint represents a new or an existing aircraft. Decision 1018 may include comparing the determined fingerprint, (e.g., the fingerprint determined in operation 1008) to a database of fingerprints stored on a server (e.g., database 608 contained in server(s) 610 of FIG. 6). At decision 1018, the machine learning computing device may query the server to determine if the ICAO address determined in operation 1006 as part of the demodulated data corresponds to an ICAO address that is already stored in the database. If the machine learning computing device determines that the ICAO is already associated with a fingerprint stored in the database, the method 1000 proceeds to operation 1020. At operation 1020, the machine learning computing device may check if the fingerprint matches. Operation 1020 may include comparing the fingerprint stored in the database that corresponds to the demodulated ICAO address to the fingerprint determined at operation 1008. If the fingerprints substantially match (i.e., the distance between the fingerprint prototypes in the feature space is below a given threshold), the fingerprint is verified. Furthermore, in some embodiments, support (e.g., features obtained from the received multiple wireless communications) from the current observation of the plane may be added to the prototype associated with this ICAO address. The prototype may be re-computed and re-averaged based on the additional support and the prototype/fingerprint stored in the database may be updated accordingly. If the determined fingerprint and the stored fingerprint do not substantially match, the machine learning computing device may reject the newly determined fingerprint and may register the multiple wireless communications as mistaken and/or fraudulent.

At decision 1018, if the machine learning computing device determines that there is no fingerprint stored in the database on the server that is associated with the demodulated ICAO address, then the method 1000 may proceed to operation 1022. At operation 1022, the machine learning computing device may register the aircraft in the database. Operation 1022 may further include sending a request to the server to add the fingerprint and its associated ICAO address to the database. Adding (e.g., registering) the fingerprint in the database provides for future reference and comparison when an aircraft exhibiting the same ICAO address is encountered.

Figure 11:
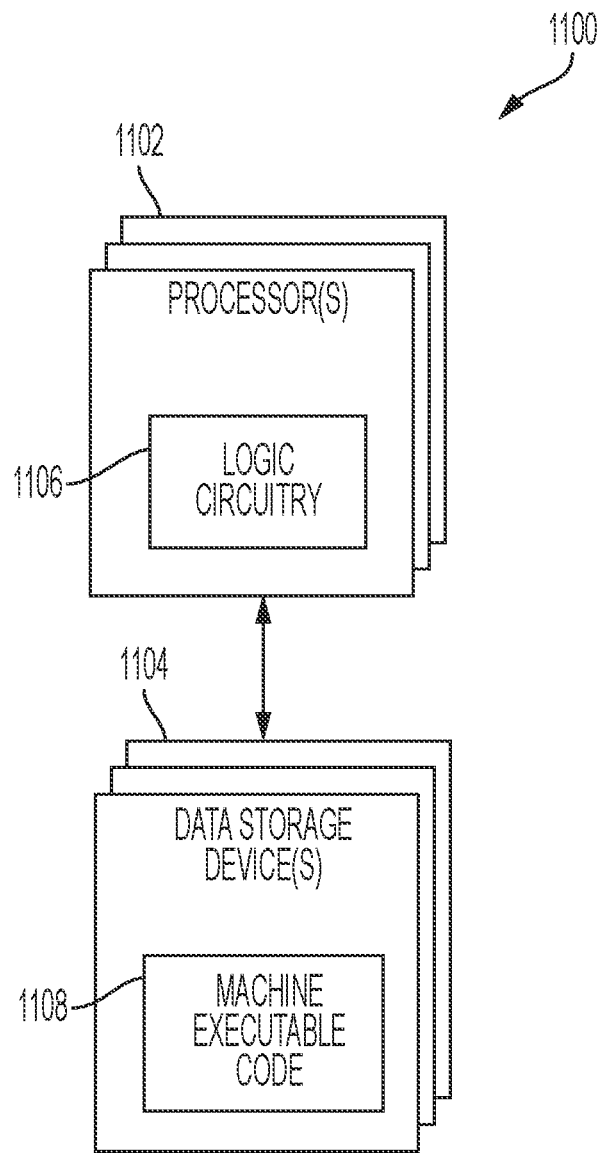
FIG. 11 is a block diagram of an example device that, in various examples, may be used to implement various functions, operations, acts, processes, and/or methods disclosed herein.

FIG. 11 is a block diagram of an example device 1100 that, in various examples, may be used to implement various functions, operations, acts, processes, and/or methods disclosed herein. Device 1100 includes one or more processors 1102 (sometimes referred to herein as "processors 1102") operably coupled to one or more apparatuses such as data storage devices (sometimes referred to herein as "storage 1104"), without limitation. Storage 1104 includes machine-executable code 1108 stored thereon (e.g., stored on a computer-readable memory) and processors 1102 include logic circuitry 1106. Machine-executable code 1108 include information describing functional elements that may be implemented by (e.g., performed by) logic circuitry 1106. Logic circuitry 1106 is adapted to implement (e.g., perform) the functional elements described by machine-executable code 1108. Device 1100, when executing the functional elements described by machine-executable code 1108, should be considered as special purpose hardware for carrying out the functional elements disclosed herein. In various examples, processors 1102 may perform the functional elements described by machine-executable code 1108 sequentially, concurrently (e.g., on one or more different hardware platforms), or in one or more parallel process streams.

When implemented by logic circuitry 1106 of processors 1102, machine-executable code 1108 is to adapt processors 1102 to perform operations of examples disclosed herein. For example, machine-executable code 1108 may adapt processors 1102 to perform at least a portion or a totality of method 900 of FIG. 9 and/or method 1000 of FIG. 10. As another example, machine-executable code 1108 may adapt processors 1102 to perform at least a portion or a totality of the operations discussed for system 600 of FIG. 6 (e.g., the operations discussed for machine learning computing device 606 of FIG. 6).

Processors 1102 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is to execute computing instructions (e.g., software code) related to examples of the present disclosure. It is noted that a general-purpose processor (may also be referred to herein as a host processor or simply a host) may be a microprocessor, but in the alternative, processors 1102 may include any conventional processor, controller, microcontroller, or state machine. Processors 1102 may also be implemented as a combination of computing devices, such as a combination of a DSP and a microprocessor, a plurality of microprocessors, one or more microprocessors in conjunction with a DSP core, or any other such configuration.

In various examples, storage 1104 includes volatile data storage (e.g., random-access memory (RAM)), non-volatile data storage (e.g., Flash memory, a hard disc drive, a solid state drive, erasable programmable read-only memory (EPROM), without limitation). In various examples, processors 1102 and storage 1104 may be implemented into a single device (e.g., a semiconductor device product, a system on chip (SOC), without limitation). In various examples, processors 1102 and storage 1104 may be implemented into separate devices.

In various examples, machine-executable code 1108 may include computer-readable instructions (e.g., software code, firmware code). By way of non-limiting example, the computer-readable instructions may be stored by storage 1104, accessed directly by processors 1102, and executed by processors 1102 using at least logic circuitry 1106. Also by way of non-limiting example, the computer-readable instructions may be stored on storage 1104, transmitted to a memory device (not shown) for execution, and executed by processors 1102 using at least logic circuitry 1106. Accordingly, in various examples, logic circuitry 1106 includes electrically configurable logic circuitry.

In various examples, machine-executable code 1108 may describe hardware (e.g., circuitry) to be implemented in logic circuitry 1106 to perform the functional elements. This hardware may be described at any of a variety of levels of abstraction, from low-level transistor layouts to high-level description languages. At a high-level of abstraction, a hardware description language (HDL) such as an Institute of Electrical and Electronics Engineers (IEEE) Standard hardware description language (HDL) may be used, without limitation. By way of non-limiting examples, VERILOG®, SYSTEMVERILOG™, or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of logic circuitry 1106 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in various examples, machine-executable code 1108 may include an HDL, an RTL, a GL description, a mask level description, other hardware description, or any combination thereof.

In examples where machine-executable code 1108 includes a hardware description (at any level of abstraction), a system (not shown, but including storage 1104) may implement the hardware description described by machine-executable code 1108. By way of non-limiting example, processors 1102 may include a programmable logic device (e.g., an FPGA or a PLC) and the logic circuitry 1106 may be electrically controlled to implement circuitry corresponding to the hardware description into logic circuitry 1106. Also by way of non-limiting example, logic circuitry 1106 may include hard-wired logic manufactured by a manufacturing system (not shown, but including storage 1104) according to the hardware description of machine-executable code 1108.

Regardless of whether machine-executable code 1108 includes computer-readable instructions or a hardware description, logic circuitry 1106 is adapted to perform the functional elements described by machine-executable code 1108 when implementing the functional elements of machine-executable code 1108. It is noted that although a hardware description may not directly describe functional elements, a hardware description indirectly describes functional elements that the hardware elements described by the hardware description are capable of performing.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A device fingerprinting system, comprising:
   one or more servers configured to store, in a database, fingerprint data and known identification codes associated with a plurality of identified transmitting devices;
   a receiver configured to receive, from an unidentified transmitting device, wireless communications; and
   a machine learning computing device configured to:
   provide a preamble portion of each of the wireless communications as an input to a previously trained convolutional neural network (CNN) configured to perform few-shot learning techniques to determine a device fingerprint based, at least in part, on the preamble portion;
   capture features in the preamble portion of each of the wireless communications via the CNN; and
   average the captured features;
   determine a device fingerprint responsive to the wireless communications using the CNN; and
   compare the determined device fingerprint to the stored fingerprint data in the database.

2. The system of claim 1, wherein each of the wireless communications comprises a demodulated identification code.

3. The system of claim 2, wherein the machine learning computing device is further configured to compare demodulated identification codes of the wireless communications with the known identification codes associated with the plurality of identified transmitting devices responsive to a determination that the determined device fingerprint matches the stored fingerprint data in the database.

4. The system of claim 2, wherein the wireless communications are automatic dependent surveillance-broadcast (ADS-B) messages from an aircraft and demodulated identification codes are international civil aviation organization (ICAO) aircraft addresses.

5. The system of claim 4, wherein the ADS-B messages indicate one or more of aircraft types, encoded latitudes, encoded longitudes, airborne velocities, surface positions, airborne positions, altitudes, aircraft identifications, and parity bits for error detection.

6. The system of claim 1, wherein the wireless communications further comprise geolocation data indicating a current location of the unidentified transmitting device.

7. The system of claim 1, wherein the machine learning computing device is further configured to add the determined device fingerprint to the database responsive to a determination that the determined device fingerprint does not match the stored fingerprint data in the database.

8. The system of claim 1, wherein the one or more servers are remotely located from the receiver and the machine learning computing device.

9. The system of claim 1, wherein the few-shot learning techniques comprises using prototypical networks.

10. A device fingerprinting method comprising:
    storing fingerprint data indicating device fingerprint features detected for a plurality of identified transmitting devices in a database;
    receiving, at a communication device, wireless communications from an unidentified transmitting device;
    providing a preamble portion of each of the wireless communications as an input to a previously trained convolutional neural network (CNN) configured to perform few-shot learning techniques to determine a device fingerprint based, at least in part, on the preamble portion;
    determining, via the trained CNN, a device fingerprint responsive to the preamble portion of each of the wireless communications using the CNN; and
    comparing the determined device fingerprint to the stored fingerprint data in the database.

11. The method of claim 10, wherein determining a device fingerprint comprises:
    capturing features in the preamble portion of each of the wireless communications; and
    averaging the captured features of each of the wireless communications.

12. The method of claim 10, further comprising determining whether the determined device fingerprint matches the stored device fingerprint features for one of the plurality of identified transmitting devices.

13. The method of claim 12, wherein receiving the wireless communications indicates a demodulated identification code associated with the unidentified transmitting device.

14. The method of claim 13, further comprising:
    responsive to determining that the device fingerprint does not match the stored device fingerprint features, adding the device fingerprint and the demodulated identification code associated with the unidentified transmitting device to the database.

15. The method of claim 13, further comprising:
    responsive to determining that the device fingerprint matches the stored device fingerprint features, determining whether the demodulated identification code matches a known identification code associated with the matched device fingerprint features.

16. A non-transitory computer-readable medium having computer-readable instructions stored thereon, the computer-readable instructions configured to instruct one or more processors to:
    train a neural network configured to perform few-shot learning techniques for fingerprinting an unidentified transmitter device;
    capture features of a preamble portion of signals received from the unidentified transmitter device using the trained neural network;
    determine a prototype for the signals by averaging the captured features of each of the signals; and
    compare the prototype to previously stored fingerprint data contained in a database.

17. The computer-readable medium of claim 16, wherein the non-transitory computer-readable instructions are further configured to instruct the one or more processors to:
    responsive to determining that the prototype matches the previously stored fingerprint data in the database, determine whether a demodulated identification code associated with the signals matches a known identification code associated with the previously stored fingerprint data.

18. The non-transitory computer-readable medium of claim 16, wherein the computer-readable instructions are further configured to instruct the one or more processors to:
responsive to a determination that the prototype does not match the previously stored fingerprint data in the database, add the prototype and a demodulated identification code associated with the signals to the database.

19. The non-transitory computer-readable medium of claim 16, wherein the neural network is a convolutional neural network (CNN).

* * * * *